2,705,697
Patented Apr. 5, 1955

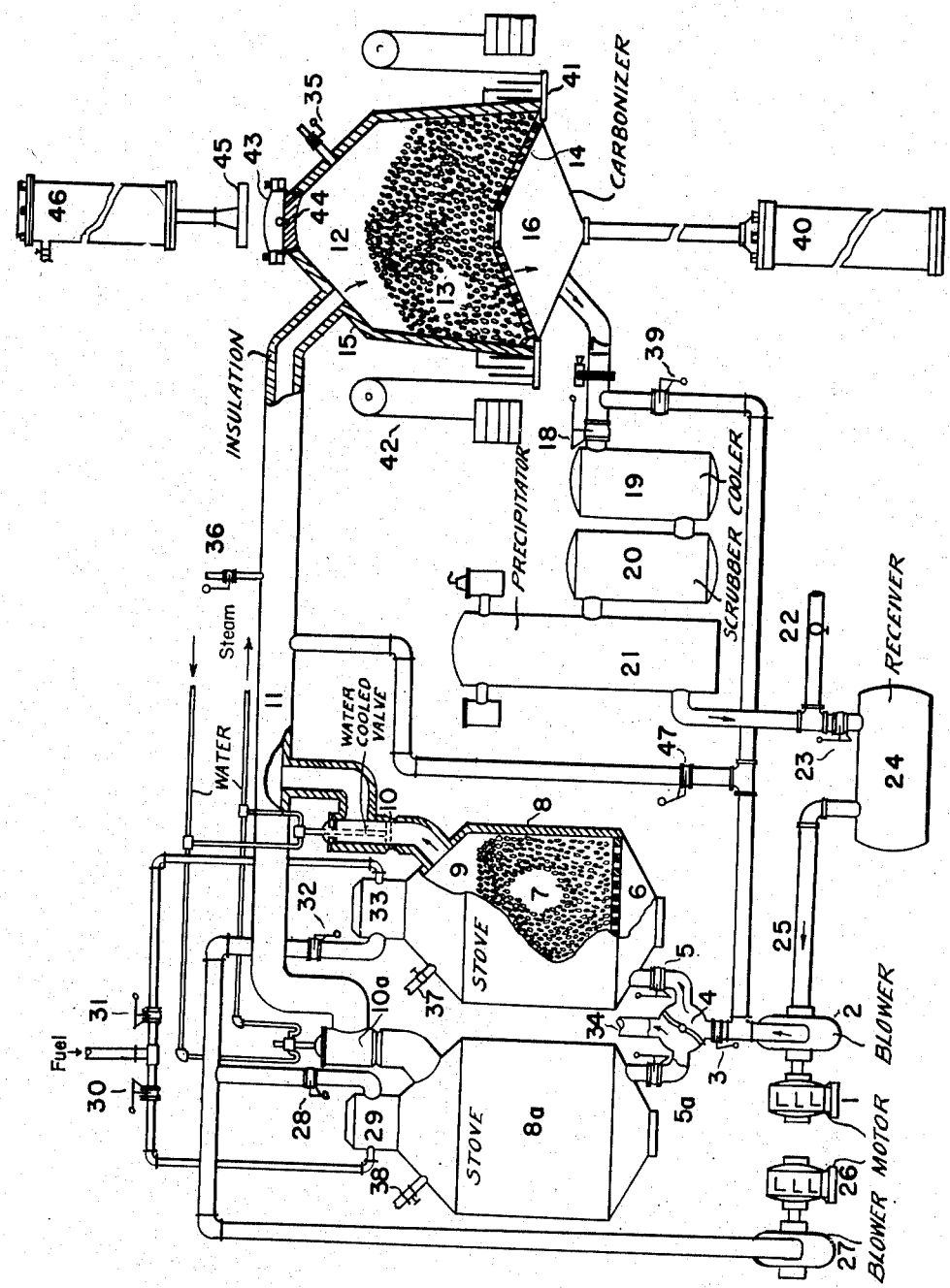

United States Patent Office

2,705,697
PROCESS FOR THE DESTRUCTIVE DISTILLATION OF CARBONACEOUS MATERIALS

Percy H. Royster, Chevy Chase, Md.

Application December 29, 1950, Serial No. 203,332

11 Claims. (Cl. 202—9)

This invention relates to a distilling or carbonizing process and apparatus wherein a stationary mass of solid carbonaceous particles is subjected at elevated temperature to chemical and thermal reaction with a moving stream of gas forced to flow through the interstitial passages resident in the mass whereby volatile constituents are removed from the solids.

The object of the invention is to provide means and methods for carrying out a variety of decarbonizing operations in which the distillation of oil shale, and the production of charcoal are illustrative. The invention contemplates the pyrolytic decomposition of a number of rather diverse carbonaceous materials. A list of examples would include: animal and vegetable wastes, farm and forrest products, municipal garbage, sewage plant filter cake, and urban and industrial wastes in general. The invention also contemplates the distillation of volatile constituents from peat, lignite and brown coals as well as coal-tar residues, coke-oven and gas-house pitch, bitumens and oil refinery still-bottoms.

The accompanying figure shows, partly in section and partly diagrammatically, apparatus adapted to carrying out the herein described process.

The operation of the process as carried out with the apparatus shown in the figure may conveniently be described as applied to the distillation of shale-oil from oil shale. Cover plate 43 and refractory block 44 at the top of reaction chamber 15 are removed. A charge of oil shale is deposited in carbonizer 15 to form a thermally insulated, rigidly constrained, substantially immobile bed of gas-traversible solid particles 13 supported on grate bars 14 which are positioned near the bottom of 15 and immediately above exhaust chamber 16. Refractory block 44 and cover plate 43 are replaced to render reactor 15 gas-tight and thermally insulated.

A stream of thermal carrier gas, initially of almost any composition, under impetus of blower 2, driven by motor 1, is forced to flow alternately through one of the pair of regenerative stoves 8 and 8a in repetitive succession. Each of these stoves is subjected, in succession, to two steps which are termed "on combustion" and "on carrier" respectively. When stove 8 is "on carrier," reversing valve 4, oriented in the position shown in the figure, permits carrier gas leaving blower 2 to flow through open valves 3 and 5 to space 6 below the grate bars supporting the heated bed of pebbles or refractory particles 7. After transit through 7, the heated carrier gas discharges into open space 9; flows through refractory-lined, water-cooled, open valve 10; pursues its passage through insulated conduit 11, and discharges into open space 12, above bed 13 in reactor 15. This preheated carrier gas flows forcibly downwardly through bed 13, traversing the interstitial opening resident between the several particles of shale therein, passing through grate bars 14 into 16 and exhausting by way of discharge conduit 17 which is clamped removably to open valve 18. The gas, admixed with distillation products, is stripped of its condensable constituents by passage through condenser 19, oil and tar scrubber 20 and electrostatic precipitator 21 and reservoir 24. The thermal carrier gas, freed thus from dust, fume, mist and condensable vapors, is returned along conduit 25 to the inlet of blower 2 for re-circulation. Any appropriate portion of the carrier gas stream is diverted from the re-entrant circuit by suitable adjustment of vent valve 22. While stove 8 is "on carrier" as described above, companion stove 8a is on its "on combustion" step. Draft-air from blower 27, driven by motor 26, flows through open draft valve 28 to burner 29. A gaseous or liquid fuel, fed through open fuel valve 30 to burner 29, is admixed with the draft air and combustion is maintained above the refractory bed in 8a whereby this bed is heated. Products of combustion discharge from 8a through open valve 5a and reversing valve 4, exhausting through chimney 34. Hot carrier valve 10a is closed.

At suitably chosen intervals, e. g., 20, 40 or 60 minutes, the functional roles of stoves 8 and 8a are reversed, 8a being placed "on carrier" and 8 "on combustion." When reversing stoves, with valves 28 and 30 closed, steam may be admitted through open valve 38 in order to purge products of combustion from stove 8a through chimney 34 when it is desirable to prevent contamination of the carrier gas with products of fuel combustion. To complete stove reversal, valve 10a is opened, reversing valve 4 is rotated 90 degrees diverting the carrier gas into the bottom of 8a. Concurrently, valve 10 is closed, stove 8 is purged with steam from 37; 31 and 32 are open, and fuel from 31 admixed with draft air from blower 27 maintains combustion from burner 33 in stove 8. Products of combustion formed in open space 9 flow downwardly through bed 7 into space 6, through open valve 5, reversing valve 4 and exhaust through chimney 34. With the above described stove operation, a continual stream of preheated thermal carrier gas is maintained in uninterrupted downward flow through the bed of shale in retort 15.

When distillation of shale has progressed to completion or to a chosen extent, the remanent solids in 15 can: (1) be discharged hot, or (2) be cooled to a low temperature and then discharged. In case (1), stove operation is halted, valves 10 and 10a are closed, steam from open valve 36 is introduced briefly to purge the system of carrier gas, and hydraulic cylinder 40 is operated to lower the hopper bottom of 15. With this arrangement, exhaust chamber 16 and grate bars 14 may conveniently be constructed integral with the hopper bottom of retort 15 and this assemblage descends as a unit when cylinder 40 is lowered. The clamps are removed from the flanges connecting conduit 17 with valve 18 when lowering the hopper bottom.

In heating, distilling or carbonizing many carbonaceous materials by the presently described method, the residual solid particles in the retort tend to adhere to each other forming relatively large "clusters" of individual particles which requires the removal of the entire bottom closure of the retort in order to permit rapid and ready discharge of the "spent" solids after the distillation step has been completed. In the case of many other carbonaceous materials, where this tendency to coke, cake or cohere is not encountered, the spent solids after distillation may more simply be discharged from a suitable discharge port located in the gas traversible grate bar assemblage at the bottom of reactor 15.

After the spent shale is removed from the grate as described above, cylinder 40 is reversed and the hopper bottom and grate bars are returned to their closed position as shown in the figure. The contact between the movable hopper bottom and retort 15 is maintained gas-tight conveniently by water seal 41. The above is a description of the operational procedure which, in effect, defines the presently invented process. Although recited in terms of the distillation of oil shale, it is believed to apply to the removal of distillable constituents and volatile matter from any form of solid material containing a thermally decomposable carbonaceous constituent, wherein the residual solids remain substantially unchanged in physical characteristics.

It should be emphasized that the idea of distilling unstable solids by forcing a heated carrier gas to traverse an assemblage of solids is far from novel. Many processes, particularly in the field of low temperature carbonization, have been described in technical literature. In each of such processes with which I am familiar, one or more of the following difficulties have been encountered: (1) satisfactory provision has not been made for supplying a thermal carrier gas of suitable composition and preheated to a suitably controlled temperature, (2) flow of gas through the solid assemblage was not uniformly distributed over the cross-section of the bed, (3) the bed of solids was not constrained to remain immobile, (4) gas flow through the interstices between the particles was not uniform, (5) oxidation both of the solid and of the distilled volatile constituents evolved from the solids occurring due to the presence of oxidizing products of fuel combustion admixed with the carrier gas, (6) operation at a sufficiently high temperature to permit satisfactory devolatilization was not possible due to the inadequate means provided for heating the carrier gas, (7) excessive pyrolysis of the primary volatile matter PVM has resulted due to the slow rate of cooling at which the volatile constituents admixed with this thermal carrier was cooled.

In order readily to indicate how effectively the distillation process herein described makes it possible to avoid the operational difficulties outlined as (1) to (8) in the preceding paragraph, a specific example will be given involving the thermal treatment of a Colorado oil shale.

Example 1.—The material treated in this illustrative example analyzes: 0.86% moisture, 16.60% organic matter and 82.53% inorganic mineral matter. The term oil shale, although widely employed, is singularly inept as applied to the raw material considered here, since the organic constituent is not an oil, and the inorganic constituent is not shale but consists largely in dolomitic limestone, feldspar and quartz. The wax-like organic constituent has been frequently referred to as kerogen and the example used here shows an ultimate analysis reading: C, 79.22%; H, 10.67%; O, 6.88%; N, 1.90% and S, 1.33%. Ignoring the nitrogen and sulfur contents, the composition of the kerogen approximates the formula $C_{16}H_{26}O$, but nothing is known as to its molecular structure or its chemical properties. It is a solid at ordinary temperatures, is insoluble in organic solvents, has no congruent melting point and is thermally unstable at its boiling point if, in fact, it has one. When heated above 500° to 600° F., it is subject to prompt and rapid thermal decomposition into (1) primary volatile matter (PVM) which is itself extremely unstable and subject to very rapid decomposition, (2) a low-hydrogen, high-carbon solid organic residue remaining in the spent shale, and (3) alkane gases ranging from methane to hexane and alkenes from ethene to pentene, accompanied by substantial quantities of $CO_2$, $CO$, $H_2$, $H_2O$ and $H_2S$.

In the conventional Fischer assay test, this shale shows only 29.25 gallons of "shale oil" per net ton of shale (density 0.911) i. e., only 222 pounds of Fischer assay oil per ton will be recovered from the 332 lbs. of kerogen per ton initially present in the shale. This 67% recovery of oil in the Fischer assay is characteristic of the thermal response of kerogen to the slow rate of Fischer heating (about 20° F. per minute) and to the unduly extended length of time (15 to 20 seconds) during which the PVM remains in the retort and exposed to the temperature of its evolution. When this shale is distilled in the conventional manner, from 20 to 24% of its kerogen is degraded into an organic residue remanent in the spent shale and from 10% to 12% is converted into "fixed gases." The thirty-odd per cent loss of oil values in such distillation is unavoidable unless the rate of heating of the raw shale particles is accelerated several-fold and the rate of cooling of the PVM evolved is as great as several thousand degrees per second.

In carrying out the distillation of the shale considered in this example, carbonizer or retort 15 is charged first with a base layer of spent shale produced in a prior distillation operation. Referring to the drawing, a charge of 54 net tons (N. T., 2000 lbs.) of spent shale is deposited on grate 14 forming a layer about 24 inches in vertical height, the diameter of the grate being 32 ft. and its inclination to the horizontal being the angle of repose of the solid particles. On top of this base layer, 450 N. T. of raw shale is placed, forming a bed of shale 30 ft. in diameter at its top and 13.5 ft. in vertical height. Both the spent shale and the raw shale have an average diameter of 0.75 inch (e. g., screened through 1-inch and held on 0.5 inch). At noon, blower 2 forces 90,000 standard cu. ft. per minute (measured at 60° F. and 29.95 inches Hg) of a recycled thermal carrier gas upwardly through refractory bed 7 in stove 8, this bed having been heated prior to noon, to a temperature sufficient to deliver the carrier gas into upper open space 12 in retort 15 at 1200° F. (T').

Carrier gas at 1200° F. flows downwardly through the raw shale bed, thereby rapidly heating the shale particles at a rate as great as 260° F. per minute and at the rate of 4.16 N. T. of shale per minute, the downward vertical rate of distillation progressing about 1.7 inches per minute. This rate of distillation decreases progressively as the distillation moves downwardly through the bed due to the taper of retort 15 becoming as low as 1.5 inches per minute as the bottom, the total time required completely to distill the 450 N. T. charge of raw shale being 108 minutes. Flow of carrier gas is continued for 6 additional minutes (i. e., until 1:54 P. M.), at which time the temperature of the carrier gas entering lower open space 16 begins to rise above 60° F. From noon until 1:48 P. M., the temperature of the exhaust gases leaving bed 13 remains cold, essentially all of the sensible heat of the carrier gas entering retort 15 being absorbed by the solid in bed 13, thus indicating a requirement of 21,600 standard cu. ft. of carrier gas per net ten of shale.

When employing the procedure of dumping the spent shale from the retort in a heated condition, flow of carrier gas is terminated at 1:54 P. M., grate bar 14 being lowered by operating cylinder 40, whereby the remanent mass of spent shale is discharged from the retort. The character of the spent shale will vary with the physical and chemical characteristics of the shale treated. Many samples of shale show a "caking or coking" tendency which frequently causes the individual shale particles to cohere into sizable clusters of particles; in such cases, the removal of the grate bars is technically recommended. Whenever this caking tendency is absent, it is permissible, and frequently desirable, to provide closable discharge ports at a suitable location near grate 14, thus making it possible to empty the retort of its spent shale residue by free-flowing gravity discharge.

Before opening carbonizing retort 15 for discharging spent shale and charging raw shale, it is convenient to close off the carbonizer from the circulating gas circuit by closing valves 10, 10a, 18, 23 and 39, whereby air can enter only the retort itself, thus preventing the admixture of air with the carrier gas remaining in the rest of the circuit.

It is an optional procedure to purge retort 15, stoves 8 and 8a and the connecting conduits with steam, introduced through steam valves 36, 37 and 38 respectively and venting steam through valves 35, 5 and 5a respectively before reversing stoves or opening retort 15. Since the greater volume of recycled gas is contained in cooler 19, scrubber 20 and precipitator 21, it is not particularly important to purge retort 15 with steam, since the volume of air which would contaminate the carrier gas would be small.

The present distillation process is based on a discovery which has been described in my U. S. Patent 1,940,371 and in my co-pending application Ser. No. 518,158, to which reference is here made. When a gas, heated to an elevated temperature T' is forced to traverse a bed of solid particles initially at a uniformly lower temperature To, a novel type of temperature distribution is established in the bed, characterized by the existence of large thermal gradients concentrated in a restricted thermal wave front. As the passage of the heated gas is continued, this wave front moves through the bed, its shape being but slightly altered during passage; and, as the wave front is transported through the bed, there is left behind it a continually expanding zone of solids heated to within a few degrees of T', while that portion of the bed in front of the approaching thermal wave remains substantially unchanged at To.

During the passage of a thermal wave of this type through a bed of solids, gas discharge from the bed substantially at To and essentially all of the sensible heat present in the entrant gas is transferred to the solids. In propelling such a sharply-defined thermal wave-front through a bed, it has been observed that the transfer of heat from gas to solid is effected with little increase in entropy, i. e., with close approach to Second Law thermodynamic reversibility. When, for example, the total heat contained in the gas blown into the bed is only one-half of the heat required to raise the entire bed to T', it is found: (1) that almost one-half of the bed nearest the gas entrance becomes heated to within a few degrees of T'; (2) that almost one-half of the bed furtherest removed from the gas entrance remains essentially at To; and (3) that the isotherms intermediate between $T'$ and $T_0$ are closely concentrated into a highly restricted zone (10 inches for 0.75 inch particles) separating the heated zone from the unheated zone. This region of large thermal space gradients of temperature is what is here termed a "thermal wave."

With the method of heating just indicated, the solid particles in the bed are subjected to a thermal history which is basically dissimilar to that which obtains in such other distillation processes with which I am familiar. If $T$ indicates temperature (in degrees F.), $t$ time (in minutes) and $x$ distance (in inches), in the bed measured from $x=0$ at the gas entrance into the bed, the maximum negative temperature gradient $(-dt/Tx)$ is large due to the close concentration of the several intermediate isotherms in the thermal wave front. The velocity $(dx/dt)$ of the wave front through the bed is related to the time-rate of heating and to the space gradient of temperature in the bed $(dT/dx)$ by the mathematical identity $$dT/dt = (dT.dx)(dx/dt)$$

In an illustrative case where the average dimension of the shale particles constituting a bed is one-half inch and when 100 standard cu. ft. per minute of a diatomic carrier gas is forced through each sq. ft. of bed cross-section, $dx/dt$ is about one inch per minute. If $T'$ is 1000° F. and $T_0$ 60° F., the maximum thermal gradient in the wave front is 170° F. per inch, corresponding to a time-rate of 170° F. per minute. If the rate of flow of gas through the bed is doubled i. e., 200 standard cu. ft. per minute per sq. ft., the space gradient of temperature at 170° F., but the time-rate of heating is doubled, i. e., remains unchanged at 170° F., but the time-rate of heating is doubled, i. e., $dT/dt$ is 340° F.

At the lower rate of blowing (100 cu. ft. per minute per sq. ft.), the velocity of the gas passing through the interstices between the particles in the bed is 146 inches per second (with 36.8% volume of voids) and the time-rate of cooling of the gas in passage through the thermal wave front is 24,820° F. per second (146 inches per minute multiplied by 170° F. per inch). It is thus seen that, without employing excessive gas velocities, the rate of cooling of the gas passing through the thermal wave front is large. The rate of cooling of the volatile matter evolved from the shale particles is, of course, equally large since the volatile matter is mixed with and carried along with the gas. At 200 cu. ft. per minute per sq. ft. of bed, the above rate of cooling will be increased to 50,000° F. per second. At 200 cu. ft. per minute per sq. ft. and with 0.25 inch particles, the cooling rate is 100,000° F. per second.

In many technically important applications of the present process, the primary volatile matter, PVM, evolved from the solid is itself thermally unstable at its temperature of release and may be subject to relatively rapid thermal decomposition into less valuable products of pyrolysis, if it is exposed to the temperature of its evolution for event a small fraction of a second. In carrying out distillation by the present method, however, the extremely rapid cooling of the PVM may properly be termed "shock quenching" and tends, in large measure, to avoid undesirable "cracking" or pyrolytic decomposition of the PVM. Thermal-wave shock-quenching in the particular case of oil-shale distillation is of notable economic value since the primary volatile matter distilled from the solids contains a large percentage of C-H bonds which are, however, quite sensitive to thermal decomposition if the PVM is permitted to remain even briefly at its formation temperature, the primary shale oil being rapidly converted into less valuable, non-condensable fixed gases and into a carbonaceous "organic residue" remaining adherent to and impregnating the spent shale particles.

In Example 1, the velocity of the gas passing through the interstices between the individual shale particles in bed 13, in the location at which the PVM is released from the kerogen, is about 144 inches per second, corresponding to a rate of cooling of 37,500° F. per second (144 inches per second multiplied by 260° F. per inch). This rate of cooling is unusually rapid compared with the rates employed in the conventional distillation of shale or other carbonaceous materials. Volatile matter evolved from kerogen at the temperature of say 660° F. is shock-quenched at the rate of 32,000° F. per second. Although the PVM is extremely sensitive to pyrolysis and is thermally decomposed at 660° F., it is but slowly affected at temperatures below 500° F. With the cooling rates obtaining in the present example, the time during which the PVM remains above 500° F. is only 0.005 second— i. e. (660–500)/32,000. The major portion of the PVM is evolved from the shale in the temperature range from 60° to 900° F. At the latter higher temperature, the PVM remains above 500° F. 0.012 second, i. e., (900–500)/32,000.

With the cooling rates in this illustrative example, the thermal decomposition of the kerogen is very considerably less than that encountered in the standard Fischer assay test. In the present case, the 332 lbs. of kerogen in the raw shale is converted into 27 lbs. of gas, 36 lbs. of organic carbonaceous residue and 269 lbs. of oil per N. T. of raw shale, indicating a recovery of 81.2% of the kerogen as oil compared with the 67% recovery in the case of the Fischer assay test; in other words, oil recovery in this example is 121% of the Fischer assay value. This shale which is conventionally rated at 29.25 gallons per ton, based on the Fischer assay by the present distillation process yields 35.5 gallons per ton, compared with its actual kerogen content of 43.7 gallons per ton.

When subjected to the rate of heating and cooling illustrated in the present example, one N. T. of raw shale produces: (1) 269 lbs. of shale "oil" analyzing: C, 84.08%; H, 11.90%, O, 0.08%; N, 1.89% and S, 1.31%; with a gross heating value of 18,630 B. t. u. per lb. (2) 362 standard cu. ft. of kerogen gas, specific volume of 13.40 cu. ft. per lb. and analyzing (by volume):

Table I

| | Per cent |
|---|---|
| $CH_4$ | 21.6 |
| $C_2H_6$ | 9.3 |
| $C_3H_8$ | 3.7 |
| $C_4H_{10}$ | 2.0 |
| $C_5H_{12}$ | 1.4 |
| $C_6H_{14}$ | 0.6 |
| $C_2H_4$ | 3.3 |
| $C_3H_6$ | 2.2 |
| $C_4H_8$ | 3.1 |
| $C_5H_{10}$ | 1.9 |
| $CO_2$ | 24.5 |
| CO | 2.5 |
| $H_2$ | 21.8 |
| $H_2S$ | 2.1 | and having a gross heating value of 1018 B. t. u. per standard cu. ft.; and (3) 61 lbs. of a solid carbonaceous residue exhibiting a gross heating value of 11,640 B. t. u. per lb. There remains in bed 13, after distillation, 1579 lbs. of spent shale including 3.86% organic residue.

With 90,000 cu. ft. per minute of carrier gas, when distillation proceeds at the rate of 4.16 N. T. per minute of raw shale, 1500 cu. ft. of water vapor, 1510 cu. ft. of kerogen gas and 1120 lbs. of PVM vapor per minute are released from bed 13. The molecular weight of the PVM and its specific volume are undetermined, but will probably average as high as one cu. ft. per lb. indicating 1120 standard cu. ft. per minute of vapor. There is, therefore, an accession to the volume of carrier gas in its downward passage through the bed of about 4.6 per cent. The volume concentration of the PVM vapor falls, perhaps, between 1.2 and 1.3%. With complete calcination of the $MgCO_3$, there will be an addition of 4700 cu. ft. per minute of $CO_2$ to the exhaust gas.

A phenomenon not commonly encountered in conventional shale distillation is characteristic of the present process, viz., the oil vapor on cooling through its condensation range (710° to 260° F.) in about 0.015 second, forms droplets which are of extremely small diameter, so much so that the resultant oil mist or "fog" is not readily removed from the gas stream, the conventional condensation and absorption methods failing to recover a satisfactory fraction of the PVM produced. It is, therefore, seldom economic or desirable to rely on cooler 19 and scrubber 20 to recover the primary product and the installation of electrostatic precipitators is almost invariably recommended. The necessity of employing a Cottrell precipitator is a direct result of the shock-quenching feature of the process and the production of a large amount of oil mist and fog is a concomitant of cooling rates measured in tens of thousands of degrees per second.

The temperature at which the carrier gas enters upper open space 12 (here 1200° F.) is of considerable technical importance. Although the oil shale deposits in Colorado, Utah and Nevada differ widely in kerogen content and in mineral composition, large quantities of alkaline earth carbonates are invariably present. The shale in this illustration shows a minerals analysis:

*Table II*

| | |
|---|---|
| CaCO₃ | 32.95 |
| MgCO₃ | 15.40 |
| SiO₂ | 33.31 |
| Al₂O₃ | 8.21 |
| Fe₂O₃ | 2.84 |
| Na₂O | 3.48 |
| K₂O | 2.47 |
| FeS₂ | 1.15 |
| P₂O₅ | 0.18 |
| V₂O₅ | 0.01 |

If the carrier gas entrant temperature (T') were much above 1700° F., the 372 lbs. of $CO_2$ (contained as carbonate) in each N. T. of shale would be transferred to the gas stream, an amount equal to 3200 cu. ft. of $CO_2$ per ton of shale or an accession of 13,300 cu. ft. per minute of $CO_2$ added to the carrier gas stream, thus raising its $CO_2$ content from the 0.39% given above to 12.70%. In such a case, the total triatomic oxidizing constituents of the gas ($CO_2$ plus $H_2O$) would amount to about 14%. Through the agency of the two reactions:

$$CO_2 + C \rightleftharpoons 2CO \quad (1)$$

$$H_2O + C \rightleftharpoons H_2 + CO \quad (2)$$

if both of these two reactions should progress to completion, 560 lbs. of oil shale per minute might be oxidized, i. e., 50 per cent of the 1130 lbs. of oil distilled from the shale. Although, at temperatures below 1700° F., and during the few hundredths of a second during which the PVM is exposed to the hot oxidizing gases, only a relatively small fraction of the possible oxidation would actually take place, nevertheless a significant loss of oil values does invariably result. It is, therefore, generally desirable to maintain the retorting temperature, T', of the carrier gas at about 1600° F. or less. The calcination temperature of CaCO₃ is 1620° F. and it is desirable, as far as possible, to restrict the thermal decomposition of the alkaline earth carbonates to a minimum.

Magnesium carbonate exhibits such a low calcination temperature (757° F.) that satisfactory distillation of kerogen from the oil shales of Colorado, Utah and Nevada is difficult to carry out at temperatures below the calcination point of MgCO₃ and the reaction temperature T', in practice, is fairly well restricted to the range from 800° to 900° F. as a minimum and up to 1500 to 1600° F. as a maximum, these higher temperatures approaching the orthobaric decomposition temperature of CaCO₃. Limited volumes of CO₂ evolved from the magnesium carbonate may be tolerated technically and economically without serious loss in thermal or chemical efficiency.

Not only is the evolution of CO₂ from the carbonates in the shale objectionable because of its potential oxidizing effect on the organic materials (oils, tars and vapors) present in the re-entrant gas circuit, but the endothermic heat absorbed in the calcination of CaCO₃ and MgCO₃ is very large, and greatly increases the thermal requirements of the process.

The carrier gas employed in the present process to transfer sensible heat from the stove pair 8, 8a to the carbonizing retort 15 may be defined as any re-cycled gas regardless of its initial composition. It is an obvious, if not widely recognized, fact that any gas brought repeatedly into contact with any number of solids of various composition and at various temperatures will, in course of time, alter its composition to become thermally stable and chemically inert. The terms "re-cycled gas" and "chemically inert, thermally stable, non-oxidizing gas" are, therefore, technically identical and interchangeable in use. In the present illustration, one might elect to initiate the operation at noon with the entire gas circuit shown in the figure filled with air at normal temperature. As the air traverses the re-entrant circuit under impetus of blower 2, the initial oxygen in the air is rapidly converted into H₂ and CO in its repeated oxidizing contact with the hydrocarbon in the kerogen, in the gas and with the organic residue.

When operating with retorting temperatures T' below 1000° F., little if any decomposition of magnesium carbonate results and the carrier gas ultimately assumes a composition approximately 70% H₂ and 30% CO. When, as in the present case, the retorting temperature is 1200° F., rather significant evolution of CO₂ from the carbonate results. This CO₂ reacts with heated carbon in the circuit following the producer gas reaction (Equation 1) being converted into twice its volume of CO. The shale in the present example contains 0.86% moisture. Water vapor entering the gas stream also reacts with hot carbon according to the water gas reaction (Equation 2) producing its own volume both of H₂ and of CO. The effect of CO₂ from the alkaline earth carbonate and of moisture from the raw shale increases the volume of recirculating gas. In the circumstance that equilibrium composition were attained, the carrier gas would comprise substantially 30% H₂ and 70% CO. From a practical standpoint, since the volumetric heat capacity of H₂ and CO differ by such a small percentage, the volume of carrier gas used in retorting is largely independent of the CO–H₂ ratio. If the retorting temperature T' were raised as high as 1400 to 1500° F., practically all of the magnesium carbonate would be subject to thermal decomposition, thus introducing 4750 cu. ft. per minute of CO₂. After only a few passages around the gas circuit, this CO₂ will become 9500 cu. ft. of CO.

There is an accession of 1510 cu. ft. per minute of gases evolved from the pyrolytic decomposition of the kerogen itself. The alkane and alkene gases contained in the kerogen gas (Table I) are all thermodynamically unstable at all retorting temperatures above 900° F. and, after sustained heating, are converted into three times their own volume of hydrogen with a corresponding production of carbon black or soot (50 lbs. per minute). The major portion of the decomposition of the hydrocarbon gases takes place in stoves 8 and 8a and a large portion of the soot becomes coated on the refractory particles therein. As a result of the water-gas and producer gas reaction and the thermal decomposition of the hydrocarbons, the volume of the re-cycled gas is increased. In order to maintain a constant gas volume, it is therefore necessary continually to bleed from the circuit from 10,000 to 15,000 cu. ft. per minute.

The shale oil, released from the shale particles in the thermal wave front, between isotherm 450° and isotherm 650° F., is subject to rapid "shock-quenching" immediately upon its evolution from the kerogen at a rate of cooling of more than 10,000° F. per second. In the brief time during which the oil vapors remain in the temperature range in which it is subject to pyrolytic decomposition, little thermal degradation of oil vapor results. The decomposition of MgCO₃ takes place at a higher temperature than the distillation of the oil and the locus of carbonate decompositon is higher than the locus of oil evolution (between the isotherms from 750° to 1200° F.), i. e., at the back of the thermal wave. The CO₂ released from the carbonates passes through the zone of oil distillation so rapidly that little oxidation of oil by CO₂ results. The initial moisture in the raw shale is released from the front of the thermal wave (between isotherms 212° F. and 300° F.) and does not pass through the oil distillation zone, nor does it come in contact with oil vapor at temperatures at which oxidation might occur.

In the present example, between noon and 1:48 P. M., about 5400 lbs. of finely divided carbon black particles is produced by the cracking of the hydrocarbon gases and some 3000 to 4000 lbs. of this "soot" becomes entrapped in the interstices between the refractory particles in bed 7 (or 7a) in stove 8 (or 8a). This carbonaceous dust, resting as a light superficial coating on the stove refractories, is an extremely reactive form of carbon and at temperatures of 1200° F. and above reacts rapidly with the H₂O and CO₂ in the recycled gas stream, according to Equations 1 and 2, forming H₂ and CO, with a large absorption of heat. As a result, essentially all of the soot deposited on the refractories is gasified and removed. When operating with retorting temperatures T' (between 1000° and 1600° F.), the volume of CO₂ in the gas passing through the stoves resulting from carbonate decomposition will frequently exceed the total amount of soot deposited in the stoves, and the gas passing through conduit 11 into retort 15 will contain small residual percentages of $CO_2$ and $H_2O$.

The upper levels of shale bed 13 exhibit temperatures sufficiently high to cause reaction between these triatomic oxidizing molecules and the organic residue remanent in the spent shale particles left in the wake of the downwardly moving wave-front. The chemical composition of the organic residue has not been determined but it has been found to be highly reactive with $CO_2$ and $H_2O$, with the result that the circulating gas after repeated recycled contact with the spent shale gasifies much of the carbon content of this residue according to Equations 1 and 2. The endothermic heat adsorbed in the progress of these two reactions, of course, lowers the temperature both of the solid particles and of the gas passing through them. As the temperature decreases, the rate of the reaction decreases concurrently, to the point where no further interaction between carbon, $CO_2$ and $H_2O$ takes place.

With the rapid rate of blowing in this illustration (120 standard cu. ft. per minute of carrier gas per square ft. of cross-section), and with shale particles 0.75 inch average diameter, the endothermic effect of the decomposition of $MgCO_3$ and of the producer and water gas reactions will lower the retorting temperature from 250° to 400° F. below $T'$ and, as the result of this temperature drop, all three of the endothermic reactions tend to halt themselves. With shale particles of smaller size than 0.75 inch, e. g., 0.375, 0.25 and 0.125 inch, the carbonates will calcine at lower temperatures. With lower rates of blowing, e. g., 75, 50 and 25 standard cu. ft. per minute per sq. ft. of bed cross-section, the gasification of the organic residue in the spent shale particles also progresses at lower temperatures.

Knowledge of the chemical kinetics involved in determining the rates of the three endothermic reactions obtaining here is inadequate to permit a quantitative discussion of the effect of temperature on oxidation. Experiments, however, have indicated that increasing recoveries of shale oil from kerogen result as retorting temperature $T'$ is raised from 850° to 1000° F., the recovery of oil when $T'$ is below 900° F. being somewhat low. Further increase in oil recovery has been found as $T'$ is increased from about 1000° to 1200° F.—the maximum recovery lying somewhere between 1200° to 1400° F. Above this latter temperature, oil recoveries decrease slightly up to about 1550 to 1650° F. At temperatures higher than 1500° F., the rate of quenching is, of course, greatly increased and, as a result, the diameter of the globules of oil fog becomes increasingly more minute. This imposes greater demands on scrubber and precipitator efficiency and it is increasingly difficult to remove the oil mist from the gas exhausting from retort 15. When temperatures above 1600° F. are employed, objectionably large volumes of $CO_2$ are evolved from the $CaCO_3$ and this greatly magnifies the extent of producer gas reaction and tends to introduce into the circulating carrier gas stream unacceptably large remanent volumes of $CO_2$, resulting in excessive oxidation of the carbonaceous material in the circuit.

For economically acceptable operation, the retorting temperature $T'$ should be held within the range 850° to 1650° F. and it is generally preferable to restrict this range to 950° to 1600° F., with temperatures between 1150° and 1350° F. appearing to produce maximum yields of condensable oils. The specific rate of flow will depend on the size, shape and uniformity of the solid particles, on the kerogen content, as well as on the moisture, $CaCO_3$ and $MgCO_3$ contents; but, in practice, the flow rate seldom exceeds 250 to 300 standard cu. ft. per minute per sq. ft. or falls below 25 such units.

During the operation described above, in which 450 tons of shale is heated between noon and 1:54 p. m., a total of 10,260,000 standard cu. ft. of carrier gas is forced through bed 12 at 1200° F., thus transferring 225 million B. t. u. from stoves 8, 8a into carbonizer 15. From noon to 1:48 p. m., about 12,800 cu. ft. per minute of the circulating gas is bled through purge valve 22, a total volume of 1,390,000 cu. ft. The net heating value of the vent gas is 308 B. t. u. per cu. ft., corresponding to a total net heat of combustion of 430 million B. t. u. To maintain stone operation from noon to 1:54 p. m., 8400 cu. ft. per minute of vent gas may be supplied to burners 29, 33. Concurrently 82,000 standard cu. ft. per minute of draft air is supplied to the stove burners through draft valves 28, 32.

It is an optional procedure to divert 20,000 cu. ft. per minute of the 90,000 cu. ft. of carrier gas through cold-gas mixer-valve 47 and to pass only 70,000 cu. ft. per minute through stoves 8, 8a. With this operation, the volume of draft air supplied to the stove burners is reduced from 82,000 to 62,000 cu. ft. per minute; thus raising the stove combustion zone temperature from 1250° to about 2000° F. The 70,000 cu. ft. of gas passing through the stoves discharges at this higher temperature and mixes with the unheated 20,000 cu. ft. by-passed through the mixer valve, thus bringing the temperature of the mixed gases down to about 1250° F. By thus splitting the carrier gas into two factions, and by heating only one of the fractions to a temperature much higher than $T'$, it is possible to reduce the dimensions of stoves 8, 8a effecting an appreciable reduction in the cost of plant installation. It is also possible in this manner to heat the stove refractories to temperatures higher than $T'$ and thus increase the rate at which the carbon soot deposited on the stove refractories are gasified by $CO_2$ and $H_2O$ according to Equations 1 and 2.

When the thermal wave front has reached a locus about 12 inches above grate bars 14 (1:54 p. m.), the remanent mass of spent shale in retort 15 may be: (1) discharged by free gravitational flow through discharge chutes (not shown); (2) if the spent shale, as it frequently does with kerogen contents as high as shown in this illustrative example, shows a tendency to form clusters of cohering particles, the spent shale may be removed by lowering grate 14; or (3) if the spent shale tends to adhere to the refractory walls of retort 15, it may be dislodged by ram 45, which is connected to cylinder 45 supplied with compressed air, steam or water, or 45 may be actuated by other conventional mechanical or electrical means. Discharging spent shale and recharging a following batch of raw shale will require about six minutes, thus completing the operating cycle in two hours. With 12 such charges per day, the capacity of the equipment described is 5400 net tons of shale in 24 hours.

*Example 2.*—In the preceding example, the spent shale was discharged in a heated condition. When the location of a shale plant is such that cheap fuel is available, it is frequently desirable to follow that procedure. In general, however, the fuel value of the organic residue as well as the sensible heat in the hot spent shale represents an important factor in the over-all economy of the process. The greater part of this sensible heat and the heating value of the carbonaceous residue may be returned to the cycle by adopting the following device of cooling the spent shale before its discharge.

The sensible heat supplied to retort 15 in the heating step of Example 1 was 225 million B. t. u. Due principally to the endothermic absorption of heat in the reactions between deposited carbon and $H_2O$ and $CO_2$, some 284 million B. t. u. is required to maintain the stoves in operation. Although the net heating value of the vent gas is sufficient to operate the stoves (428 million B. t. u.), it is frequently desirable to reserve as much vent gas as possible for other plant uses. The sensible heat of the spent shale (123 million B. t. u.) also is of significant value, and the heating value of the 24,000 pounds of the carbonaceous residue in the spent shale (280 million B. t. u.) is very much worth recovering. The sum of these last two thermal assets remaining at the end of the heating step exceeds the total heat required for stove operation by 10% to 20%.

In order to return this heat to the process, it is convenient to force 90,000 cu. ft. per minute of atmospheric air from blower 2 through open valve 39 to flow upwardly through bed 13 from 1:54 to 3:48 p. m. In the upward passage of this unheated air through the bed, a cooling wavefront is promptly established in the spent shale similar to the heating wave front but moving upwardly through the bed, not downwardly. As the air flows upwardly through 13, the shale particles are cooled and the air heated. Combustion of organic residue by $O_2$ in the air causes further rise in temperature, bringing the air stream to temperatures which approximate $T'$ (1200° F.). The temperature of the air exhausting into the open space 12 will, of course, depend on the extent of the carbonate decomposition in the preceding heating step and to the extent of the gasifying reactions (Equations 1 and 2) which took place in bed 13 during the heating step. With a shale containing as much as 16% kerogen, this temperature will be usually higher than T'. The air discharging from open space 12, from 1:54 to 3:48 p. m. flows through conduit 11, open hot-gas-valves 10, 10a, into open space 9, 9a in stoves 8, 8a and thence downwardly through bed 7, 7a, exhausting through chimney 34. The temperature of the air in 9, 9a, if too high, can be reduced by by-passing a controlled amount of unheated air from blower 2 through mixer-valve 47 into conduit 11. If the air temperature should be too low, the temperature in 9, 9a can be increased by the admission thereinto of a controlled amount of gas through burners 29, 33.

The adoption of the above device of a thermal blow-back step in which the sensible heat of the spent shale is returned from retort 15 to stoves 8, 8a is not an indispensable part of the present invention if considered merely from an academic standpoint. The improvement in the over-all efficiency of the operation, however, is of great economic importance.

In the actual mining of the oil shales in Colorado, Utah and Nevada, it is necessary to treat shales containing less than the 16% kerogen of this example, some of the mined shale exhibiting as little as 5% kerogen. In treating low grade shales, the sensible heat in the spent shale at the end of the distillation step becomes quite significant. Although the volume of carrier gas will not vary greatly from 21,000 to 23,000 standard cu. ft. of carrier gas per ton of shale, the volume of vent gas and the amount of organic residue will be quite low and technical value of the thermal blow-back step is of major importance and may properly be regarded as essential to profitable operation. When a repetitive succession of heating steps and blow-back steps is employed, the total time of the entire operating cycle is practically doubled and the capacity of a given retort is reduced to about one-half, in effect doubling the investment for a given plant capacity.

In practice, it is necessary to treat shales varying not only in kerogen content but to treat particles of varying sizes. Run-of-the-mine shale includes particles or blocks ranging from 2 to 4 feet in diameter. Before distillation, the shale should be crushed to pass a 2.5 to 4 inch grizzly. Optimum results are realized by screening the crushed shale into several screen sizes and by providing several retorts, each with its dimensions designed to be appropriate to the particle size treated. For example, if four 240-ton charges of shale, screened to 4 different particle sizes, are distilled in 4 retorts, the pressure required to blow equal volumes of carrier gas (e. g., 63,000 cu. ft. per minute) through the 4 beds will be identical (7 lbs. per sq. inch maximum), if the dimensions of the four retorts are designed as follows:

Table III

| Retort | Particle Diameter | Bed Diameter | Depth of Bed |
| --- | --- | --- | --- |
| 1 | 1.750 in | 17 ft. 5 in | 26 ft. 7 in. |
| 2 | 1.125 in | 19 ft. 8 in | 21 ft. 6 in. |
| 3 | 0.500 in | 23 ft. 10 in | 14 ft. 7 in. |
| 4 | 0.125 in | 41 ft. 0 in | 4 ft. 11 in. |

Each of the above four beds is equally gas-traversable. The common assumption that beds of small size particles are less readily gas traversable rests on the inappropriate restriction that the relation between the area and the depth of each bed must remain the same. In order to reduce the power required in the process, it is recommended that the dimensions of retort 15 be adjusted to provide beds of particles relatively broad and shallow, the terms "relatively broad" and "relatively shallow" depending, of course, on particle size and the dimensions given in Table II being defined each as broad and shallow.

Example 3.—An important technical application of the present invention is concerned with the destructive distillation of wood and other solids of vegetable origin. Of particular interest is the pyrolysis of sawmill debris and forest waste products such as tree branches, roots, bark, slabs and other lumber rejects. Before retorting, such unmarketable waste material should be sawed, split, hogged or shredded in a crusher to form blocks and pieces from 2 to 6 inches average diameter. As a specific example, a charge of 375 net tons of oak blocks forms a bed 38 ft. in diameter and 20 ft. in depth. Although this bed 13 may be carbonized in retort 15 in the manner described in Examples 1 and 2, it is frequently recommended that the heating operation be carried out in two successive steps.

In a preliminary, low-temperature heating operation, 300,000 standard cu. ft. per minute of primary, recycled, carrier gas containing large concentrations of $CO_2$ and $H_2O$, but essentially free from $O_2$, preheated to a primary retorting temperature T', within the range from 400° to 600° F., is forced to traverse the bed from noon to 4:25 P. M. At this low temperature T', the cellulose constituent of the wood is subject to prompt thermal decomposition, evolving large quantities of $CO_2$ and chemically combined water, this gas evolution being accomplished by a large absorption of heat required for the distillation of the free and combined water and the heat involved in the endothermic decomposition of the cellulose carbohydrate. The hemicellulose, lignin and the lignocellulosic constituents of the oak, although thermodynamically unstable between 400° and 600° F., are sluggishly reactive and the major portion of the volatile $CO_2$ and $H_2O$ produced in the carbonization of hardwood can be removed from the bed by the passage of the primary thermal carrier through the bed at the low temperature T', the rate of progress of the producer- and water-gas reactions being extremely slow, with the result that only a small amount of oxidation is encountered.

The rate of progress of the heating wave through bed 13 (0.85 inch per minute) is quite slow despite the large volume of carrier gas traversing the bed. From noon until 4:25 P. M., evolution of $CO_2$ and $H_2O$ from the wood totals 32,000 standard cu. ft. per minute, the gas evolved containing 84.5% by volume water vapor and 15.5% lean wood gas. On a dry basis, the lean gas analyzes: $CO_2$, 59.8%; CO, 25%; $CH_4$, 9.7%, with small concentrations of hydrogen, alkenes and higher alkanes. Small amounts of methanol, acetone and acetic acid are found in the exhaust gases. The total volume of gas exhausting from the retort is 332,000 cu. ft. per minute, containing 8.1% water vapor. After condensation of moisture and removal of by-products in cooler 19, scrubber 20 and precipitator 21, the gas volume is reduced to 316,000 cu. ft. per minute, of which 16,000 cu. ft. per minute is vented through bleed valve 22, the remaining volume being returned to the inlet of blower 2. At 4:25 P. M., circulation of the primary gas is terminated and recycled flow of a second thermal carrier gas is initiated, blower 2 forcing 125,000 cu. ft. per minute of the second carrier through the gas circuit from 4:25 to 5:10 P. M. During this period, a secondary retorting temperature T" is employed and this is controlled within the range from 750° to 1050° F., at which temperatures the thermal destruction of the lignin and lignocellulose in the semi-charred wood progresses rapidly. The pyrolysis of wood at this higher reactive temperature is exothermic, to the extent of several hundred B. t. u. per pound of dry wood. The evolution of heat generated during secondary pyrolysis serves to accelerate greatly the progress of the secondary heating wave through the bed of semi-char. It is necessary to adjust the temperature T" properly when treating the various types of hard and soft woods encounted, in order to control the temperature of the secondary carbonization. Readings on thermocouples installed at several levels in bed 13 permit ready control of bed temperatures during this second step. It is rather important to avoid heating the bed in excess of 1200° to 1300° F., in order to obtain a maximum yield of alcohols, ketones and acids, as well as to produce chemically reactive, readily oxidizable residual charcoal suitable for domestic and industrial uses.

In the distillation of 375,000 tons of oak wood described above, there is produced 3300 gallons of green liquor (pyroligneous acid) and 22,000 gallons of wood tar. The green liquor on subsequent distillation yields 800 gallons of acetic acid, 1400 gallons of methanol, the wood tar distilling to 5,200 gallons of wood creosote and 8000 gallons of solvent oil, the residue being wood pitch. There remains in the retort some 95 tons of charcoal.

The flow of heated secondary carrier gas is terminated at 5:10 P. M. and a continuation of gas-flow at the rate of 100,000 standard cu. ft. per minute is maintained through the heated bed of charcoal from 5:10 to 6:12

P. M., during which interval unheated carrier gas is recycled through the system in order to establish a cooling wave front in the hot charcoal and progressively to cool the entire mass in bed 13 to atmospheric temperature or below the ignition temperature of charcoal in air. During the secondary carbonizing step (4:25 to 5:10 P. M.) and the cooling step (5:10 to 6:12 P. M.), the carrier gas is recycled around the re-entrant gas circuit described in Examples 1 and 2; after repeated recycling this carrier gas becoming thermally stable and non-reactive with respect to the carbon and carbonaceous materials in bed 13, being essentially a mixture of CO and $H_2$. The total carbonizing capacity of the retort described in Example 3 is 1400 tons of wood charged, producing about 360 tons of charcoal in 24 hours.

The description of the operating procedure involved in the pyrolytic production of shale oil from oil shale and in the destructive distillation of wood by the presently invented process and in apparatus adapted to it has been given in order specifically to illustrate in detail the basic features of the present invention. It is understood, of course, that the process is applicable to a wide variety of solids containing decomposable carbonaceous constituents, where the solid particles when heated exhibit no tendency toward fusion, pseudo-fusion or intumescense, e. g., in the carbonization of a coking or caking bituminous coal. The present invention is further restricted to those typs of carbonaceous solids which must be heated above a primary lower retorting temperature in order to release a desired volatile constituent from the solids, but which must not be heated substantially above a secondary higher retorting temperature in order to avoid further undesirable pyrolysis.

The operation of the process and the apparatus employed has been described and illustrated in the drawing for the case of single retort 15 and a single pair of pebble stoves. It is understood that in actual plant construction it is frequently desirable to provide several pairs of pebble-type gas preheaters and also a plurality of retorts. In operating such an enlarged plant, the several operating steps through which the stoves and retorts are carried will be arranged on a time schedule in which the charging of the solids into the retort, the heating step, the thermal blow-back step and the several stove reversals will be staggered in an obvious conventional manner.

The present application contains matter in common with my application No. 518,158 filed January 13, 1944, now U. S. Pat. No. 2,536,098, and is a continuation in part of that application.

What I claim is:

1. The process which comprises charging a retort with an assembled mass of solid particles to form an inclosed, immobile, gas-traversable bed of solids within the retort, the solids initially containing a substantial amount of a nonbituminous, thermally unstable, carbonaceous material rapidly decomposable above an elevated temperature $T_1$ at least 400° F. and a substantial amount of a second carbonaceous constituent rapidly decomposable above a second elevated temperature $T_2$ at least 600° F. and higher than $T_1$; forcing a recycled thermal carrier gas consisting principally of $N_2$, CO and $H_2$ and free from intentional additions of the oxidizing gases $CO_2$, $H_2O$ and $O_2$ and substantially free from admixture with products of fuel combustion, preheated to a retorting temperature $T'$ between 600° F. and 1700° F. and, intermediate between $T_1$ and $T_2$, to enter the retort and traverse the bed whereby the solid particles therein are subjected to selective destructive distillation, wherein the major portion of the first carbonaceous constituent is converted into a vapor-phase product of pyrolysis and the major portion of the second carbonaceous constituent remains undecomposed and resident in the solids; discharging the gas from the retort; separating a major portion of the condensable pyrolytic product from the gas; venting a minor portion of the said separated thermal carrier gas from the circuit in an amount controlled whereby the circulating gas volume is maintained constant; returning the remaining volume of carrier gas to the re-entrant gas circuit; and re-heating the said gas to the temperature $T'$ in a thermal interchanger prior to its re-entrance into the retort and re-passage through the bed.

2. The process described in claim 1 wherein $T_1$ is 400° F. and $T_2$ is 1700° F.

3. The process described in claim 1 wherein the solid charge is oil shale, the first carbonaceous constituent is kerogen and the second carbonaceous constituent is calcium carbonate.

4. The process described in claim 1 wherein the solid charged is of vegetable origin, the first carbonaceous constituent is endothermic decomposable cellulose and the second carbonaceous constituent is exothermically decomposable lignin and lignocellulose.

5. The process described in claim 1 wherein the solids charged is oil shale, the first carbonaceous constituent is kerogen, the second carbonaceous constituent is calcium carbonate, $T_1$ is 600° F., $T_2$ is 1650° F. and $T'$ is within the temperature range 950° F. to 1400° F.

6. The process which comprises charging a retort with a mass of oil shale particles, initially containing substantial amounts of kerogen and of calcium carbonate to form a gas traversable bed of particles enclosed and retained immobile within the retort; positively propelling a stream of recycled thermal carrier gas consisting essentially of $N_2$, CO and $H_2$ and free from intentional additions of the oxidizing gases $CO_2$, $H_2O$ and $O_2$ and preheated prior to entrance into the bed to an elevated retorting temperature $T'$, between 600° and 1700° F., to traverse the interstitial passages in the bed whereby a progressively expanding portion of the bed becomes heated above the temperature $T_1$ at which kerogen is subject to rapid destructive distillation and at which it evolves a condensable vapor-phase product of pyrolysis, $T'$ being maintained above $T_1$ and below the temperature $T_2$ at which calcium carbonate is subject to rapid decomposition; scrubbing the gas discharging from the bed and stripping therefrom the said condensable pyrolytic product; venting from the gas circuit a controlled minor portion of the recirculating gas whereby its volume is maintained sensibly constant; transferring the unvented portion of the carrier gas to the gas circuit and reheating to $T'$ and for re-passage in the heated condition through the bed; continuing the circulation of the carrier into the circuit until the major portion of the kerogen in the bed has been destructively distilled; and thereafter removing the remanent shale from the retort.

7. The process described in claim 6, wherein at the termination of the flow of the said carrier gas through the bed when the major portion of the bed has been subjected to destructive distillation a second carrier gas consisting largely of $N_2$, CO and $H_2$ but containing a controlled amount of at least one of the oxidizing gases $CO_2$, $H_2O$ and $O_2$ is forced to traverse the bed whereby to transfer sensible heat from the heated shale particles remanent in the bed to the second carrier gas, the concentration of the oxidizing constituents of the second carrier gas being controlled whereby to effect the gasification of a substantial amount of the organic carbonaceous residue remanent in the spent shale, whereby a substantial portion of the heat of combustion of the said organic residue is imparted to the second carrier, forcing the heated second carrier after passage through the bed to traverse a mass of heat exchanging refractories in at least one of at least two regenerative thermal interchangers in repetitive alternating succession and causing the first said carrier gas to traverse the said heat exchangers in suitably synchronized alternating succession whereby a substantial proportion of the heat of the second carrier gas is transferred to the said first carrier gas; terminating the flow of the second carrier when the major portion of the bed has been oxidized and cooled; and thereafter removing the cooled spent shale from the retort prior to recharging a succeeding charge of raw shale.

8. In the process described in claim 1, the improvement which comprises initially establishing a relatively shallow, broadly extended layer of solid particles substantially free from decomposable carbonaceous constituents within the retort adjacent the locus of gas exhaust therefrom prior to the introduction of the charge of particles containing decomposable carbonaceous constituents; assembling the said charge into a bed of particles immediately contiguous to the said layer; forcing the heated carrier gas to traverse the bed and the layer in consecutive sequence whereby to establish therein a thermal wave exhibiting relatively large temperature gradients concentrated into a wave-front, positioned initially adjacent the locus of carrier gas entrance into the bed; continuing the flow of the carrier through the bed whereby the wave front is propelled therethrough; and terminating the flow of carrier when substantially all of the said charge has been heated to maximum temperature, when the wave front has assumed a central position within the said layer, and when substantially all of the thermal wave is positioned within the layer.

9. The process described in claim 7 wherein the concentration of the oxidizing gases $CO_2$ and $H_2O$ in the second carrier gas is maintained a minimum.

10. The process described in claim 4 wherein the charge of solid particles is wood.

11. In the process described in claim 1, the improvement which comprises separating the charge of solid particles into a plurality of screen sizes and charging each discrete screen size of particles into a connate retort exhibiting a ratio of diameter to depth adapted to form a gas traversable bed of solids therein.

References Cited in the file of this patent

UNITED STATES PATENTS

| | | |
|---|---|---|
| Re. 1,605 | Howarth | Jan. 19, 1864 |
| 21,805 | Atwood | Oct. 19, 1858 |
| 670,047 | Westman | Mar. 19, 1901 |
| 680,784 | Knox | Aug. 20, 1901 |
| 705,213 | Danbe | July 22, 1902 |
| 768,230 | Knox | Aug. 23, 1904 |
| 990,891 | Loamis | May 2, 1911 |
| 1,365,128 | Thomas | Jan. 11, 1921 |
| 1,814,463 | Trent | July 14, 1931 |
| 1,840,403 | Loebell | Jan. 12, 1932 |
| 1,984,380 | Odell | Dec. 18, 1934 |
| 2,011,054 | Karrick | Aug. 13, 1935 |
| 2,030,852 | Berry | Feb. 18, 1936 |
| 2,121,733 | Cottrell | June 21, 1938 |
| 2,131,702 | Berry | Sept. 27, 1938 |
| 2,466,593 | Jones | Apr. 5, 1949 |
| 2,536,098 | Royster | Jan. 2, 1951 |
| 2,550,677 | Dalin et al. | May 1, 1951 |

FOREIGN PATENTS

| | | |
|---|---|---|
| 107,907 | Australia | July 5, 1939 |
| 114,824 | Australia | Mar. 3, 1942 |
| 211,033 | Great Britain | Feb. 14, 1924 |
| 374,923 | Great Britain | June 13, 1932 |